(12) United States Patent
Mayville et al.

(10) Patent No.: US 9,114,410 B1
(45) Date of Patent: *Aug. 25, 2015

(54) GAS GENERATING SYSTEM

(71) Applicant: TK Holdings Inc., Armada, MI (US)

(72) Inventors: Brian A. Mayville, Northville, MI (US); Dale E. Tauchen, Clinton Township, MI (US); Joshua D. VanHooser, Waterford, MI (US)

(73) Assignee: TK Holdings Inc., Amada, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/067,226

(22) Filed: Oct. 30, 2013

Related U.S. Application Data

(62) Division of application No. 13/086,559, filed on Apr. 14, 2011, now Pat. No. 8,573,644.

(51) Int. Cl.
*B05B 1/00* (2006.01)
*B60R 21/26* (2011.01)
*B60R 21/261* (2011.01)
*B60R 21/264* (2006.01)

(52) U.S. Cl.
CPC ............... *B05B 1/005* (2013.01); *B60R 21/26* (2013.01); *B60R 21/261* (2013.01); *B60R 21/2644* (2013.01)

(58) Field of Classification Search
USPC .......................................... 280/741, 740, 742
See application file for complete search history.

(56) References Cited

U.S. PATENT DOCUMENTS

| | | | |
|---|---|---|---|
| 6,189,926 B1 * | 2/2001 | Smith | 280/737 |
| 6,802,532 B2 * | 10/2004 | Heigl et al. | 280/736 |
| 8,007,003 B2 * | 8/2011 | Kalandek | 280/740 |
| 8,573,644 B1 | 11/2013 | Mayville et al. | 280/741 |

* cited by examiner

*Primary Examiner* — Faye M Fleming
(74) *Attorney, Agent, or Firm* — L.C. Begin & Associates, PLLC.

(57) ABSTRACT

A gas generating system includes a housing and a nozzle coupled to the housing. The nozzle includes at least one bi-directional gas exit passage configured to provide a thrust-neutral release of gases from the nozzle.

3 Claims, 4 Drawing Sheets

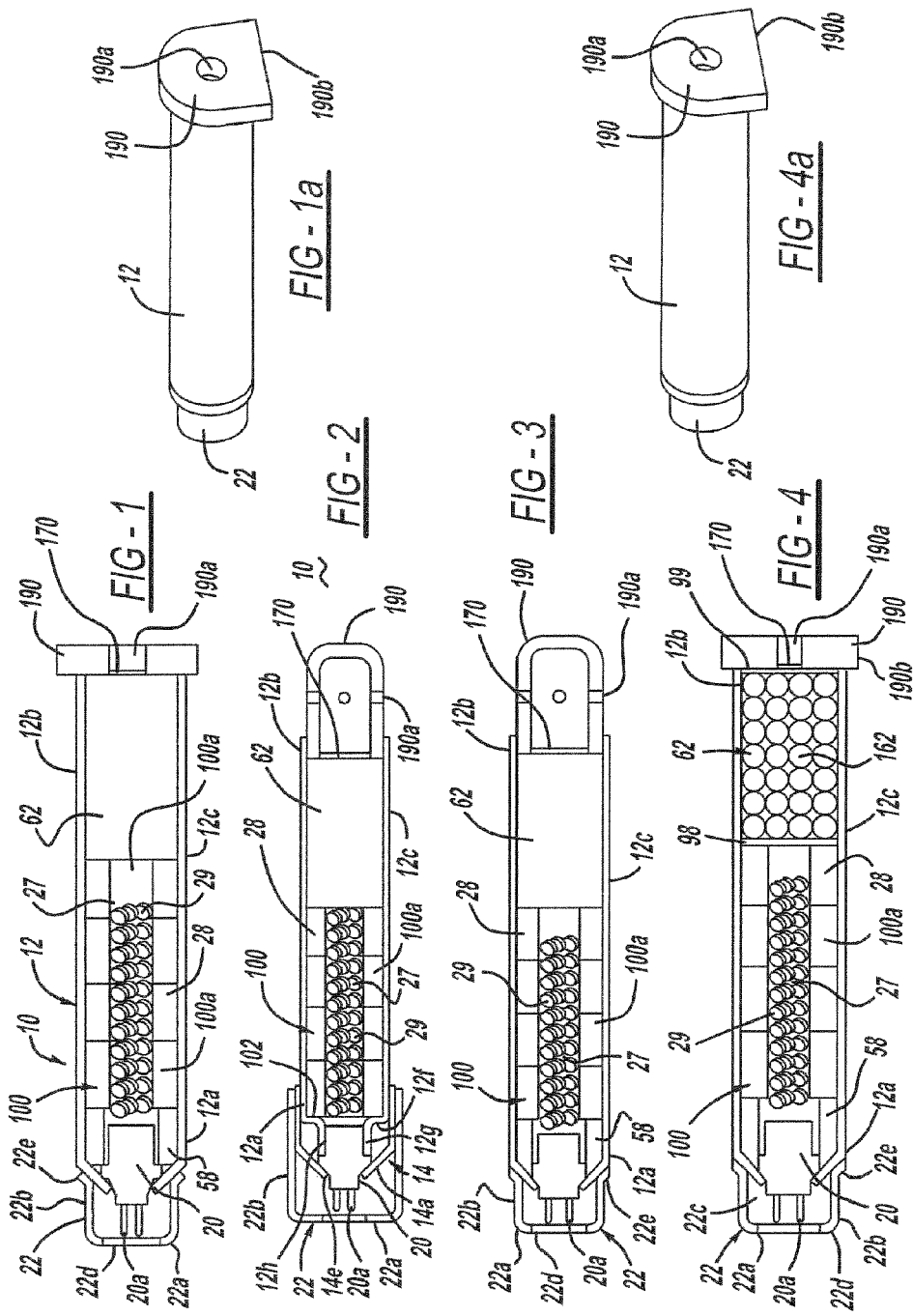

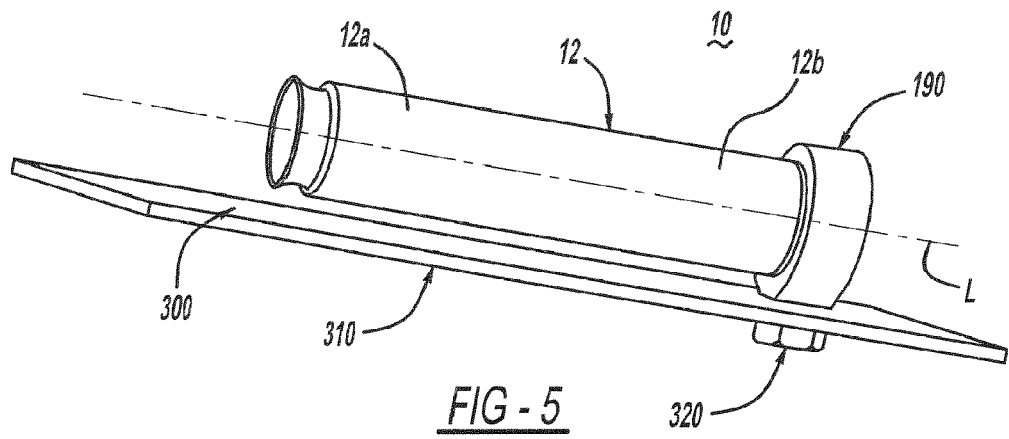
FIG - 5
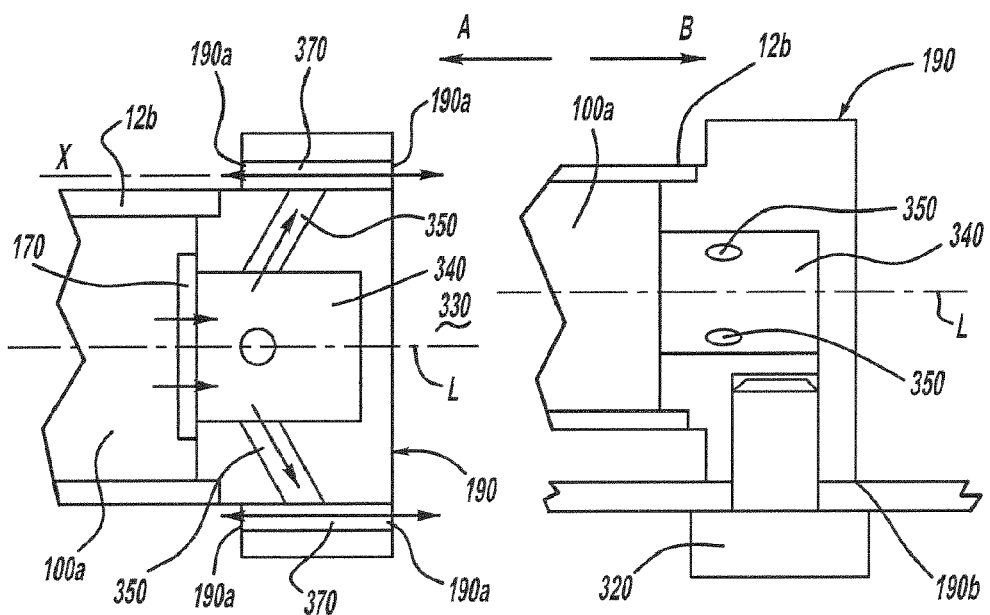
FIG - 6
FIG - 7

GAS GENERATING SYSTEM

CROSS REFERENCE TO RELATED APPLICATIONS

This divisional application claims the benefit of prior U.S. application Ser. No. 13/086,559, which claims the benefit of U.S. provisional application Ser. No. 61/324,113, filed on Apr. 14, 2010, the disclosure of which is incorporated herein by reference.

BACKGROUND OF THE INVENTION

The present invention relates to gas generating systems for generating pressurized gases used to inflate one or more inflatable devices.

The variety of possible applications for gas generating systems is constantly increasing. There is also an ongoing need to reduce the overall cost of the gas generating system.

SUMMARY OF THE INVENTION

In one aspect of the embodiments described herein, a gas generating system is provided including a housing and a nozzle coupled to the housing. The nozzle includes at least one bi-directional gas exit passage configured to provide a thrust-neutral release of gases from the nozzle.

In another aspect of the embodiments described herein, a gas generating system is provided including a housing and a nozzle coupled to the housing and structured for attachment to an object by an attachment means. The nozzle includes at least one bi-directional gas exit passage configured to provide a thrust-neutral release of gases from the nozzle, so as to minimize forces transmitted from the nozzle to the attachment means due to flow of gases from the nozzle.

BRIEF DESCRIPTION OF THE DRAWINGS

In the drawings illustrating embodiments of the present invention:

FIG. 1 is a cross-sectional side view of a gas generating system in accordance with one embodiment of the present invention.

FIG. 1a is a perspective view of the gas generating system of FIG. 1 showing a particular embodiment of a nozzle 190 configured for mounting the gas generating system to a portion of a vehicle.

FIG. 2 is a cross-sectional side view of a gas generating system in accordance with another embodiment of the present invention.

FIG. 3 is a cross-sectional side view of a gas generating system in accordance with another embodiment of the present invention.

FIG. 4 is a cross-sectional side view of a gas generating system in accordance with another embodiment of the present invention.

FIG. 4a is a perspective view of the gas generating system of FIG. 4 showing a particular embodiment of a nozzle 190 configured for mounting the gas generating system to a portion of a vehicle.

FIGS. 5-7 are views showing a gas generating system mounting structure and a gas distribution mechanism in accordance with an embodiment of the present invention.

DETAILED DESCRIPTION

Figure 8:
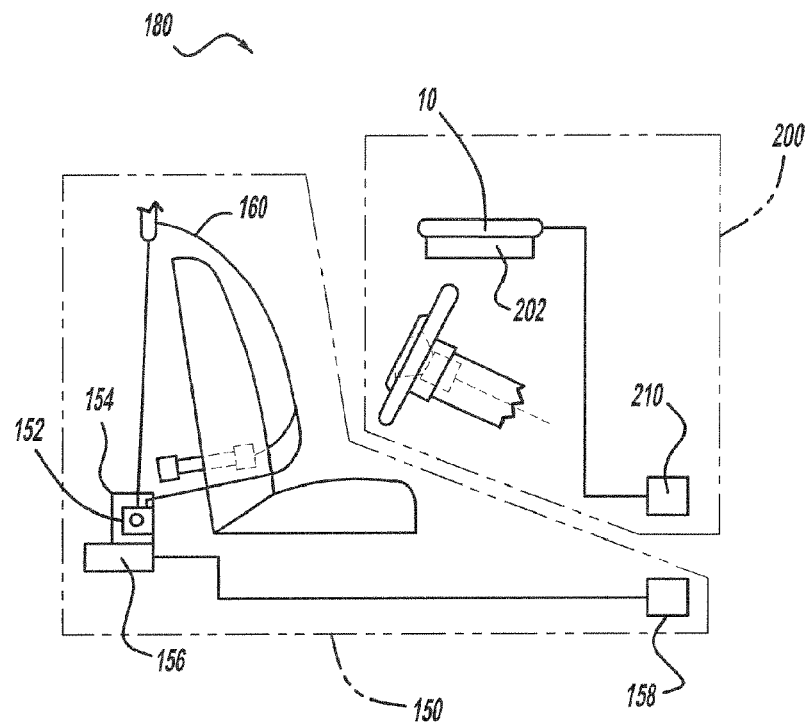
FIG. 8 is a schematic representation of an exemplary vehicle occupant restraint system incorporating a gas generating system in accordance with an embodiment of the present invention.

In the descriptions set forth herein, like reference numerals refer to like elements of embodiments of the present invention.

Referring to FIG. 1, a gas generating system 10 includes a substantially cylindrical housing 12 having a first end 12a, a second end 12b opposite the first end, and a wall 12c extending between the ends to define a housing interior cavity 100. A portion 100a of cavity 100 defines a combustion chamber for a combustible gas generant material 28 described in greater detail below. Housing 12 is made from a metal or metal alloy and may be a cast, stamped, deep-drawn, extruded, or otherwise metal-formed.

Housing first end 12a is configured for receiving a portion of a suitable initiator 20 (described below) therein, and is also configured to aid in retaining the initiator in place within the housing 12 once the initiator has been positioned. Housing end 12a may be structured so as to support and maintain initiator 20 in position during operation of the gas generating system. As seen in FIGS. 1-4, the housing end 12a may be configured to abut or engage a portion of the initiator to hold the initiator in position.

In one embodiment (seen in FIGS. 1, 3, and 4), housing first end 12a is tapered or formed inwardly as shown to provide a relatively narrow opening 12e in the end of the housing through which initiator terminals 20a extend. The walls of housing first end 12a may engage a portion of the initiator, and the opening 12e is sized to prevent passage of the initiator body therethrough. In another embodiment (seen in FIG. 2), the outer dimension of housing wall at first end 12a is necked down to form a shoulder 12f and a wall 12g extending from the shoulder to define an opening 12h for receiving and engaging a portion of the initiator therein. A separately formed cap 14 incorporating a tapered wall portion 14a defines a relatively narrow opening 14e and is welded or otherwise suitably attached to housing end 12a. The opening 14e is sized to prevent passage of the initiator body therethrough. In the embodiment shown in FIG. 2, cap 14 has an inner dimension D sized to fit over the outermost dimension of housing 12 for attachment thereto. In any of the embodiments described herein, initiator 20 may engage housing 12 or cap 14 in an interference fit, an adhesive may be used to aid in securing the initiator in position, or a portion of the housing end 12a may be crimped over the initiator to secure the initiator in position. In addition, any of a variety of known, suitable methods may be employed to secure the initiator 20 in position within the housing.

In any embodiment described herein, an interface between the initiator and housing 12 or cap 14 (or any space between the initiator and the housing or cap in which the initiator is positioned) may be structured or sealed so as to provide a gas-tight seal between the initiator and the housing or cap. Any suitable means (for example, an adhesive or an O-ring or other resilient seal) seal may be provided to form the seal. One example of an adhesive suitable for securing the initiator in the housing and/or forming the desired seal is a known RTV silicone adhesive commercially available from any of a variety of vendors, for example, Dow Corning of Midland, Mich. and Applied Silicone Corporation of Santa Paula, Calif. Other suitable methods may also be used to aid in securing the initiator in the desired position.

Referring again to FIGS. 1-4, initiator 20 is positioned and secured in housing first end 12a so as to provide fluid communication between the initiator and a booster material 27 and/or an auto-ignition material 29 (described below) positioned in housing cavity portion 100a after activation of the gas generating system. Initiator 20 may be fabricated as known in the art, and initiators suitable for the applications described herein are commercially available from any of a variety of vendors. One exemplary initiator construction suitable for the applications described herein is disclosed in U.S. Pat. No. 6,009,809, herein incorporated by reference.

Referring again to FIGS. 1-4, a shroud or receptacle 22 is operatively coupled to housing first end 12a. Receptacle 22 has a base portion 22a and a wall 22b extending from base portion 22a to define an enclosure 22c configured for receiving a portion of initiator 20 therein. An opening 22d is formed in base portion 22a to enable communication between enclosure 22c and an exterior of the receptacle. The receptacle wall 22b may include an outwardly flared portion 22e configured for engaging a tapered end portion 12a of housing 12, as shown in FIGS. 1, 3, and 4. Flared portion 22e may be welded, glued, or otherwise suitably attached to housing 12. In another embodiment, as shown in FIG. 2, the receptacle wall 22b is dimensioned so as to fit over cap 14 and may be welded, glued, or otherwise suitably attached to cap 14 and/or to housing 12.

Receptacle 22 acts to cover and protect the portion of initiator 20 projecting from housing end 12a. Receptacle 22 may also be configured to provide an interface for enabling or facilitating mating between initiator terminals 20a and a connector (not shown) used for supplying an actuation signal to the initiator, in a manner known in the art. The connector engages terminals 20a through receptacle opening 22d. Receptacle 22 may be stamped, molded, drawn, or otherwise formed from carbon steel, stainless steel, a polymeric material, or any other suitable material.

Optionally, as in the embodiment shown in FIG. 2, a rupturable, fluid-tight seal 102 may be positioned proximate housing first end 12a to isolate or seal off cavity portion 100a containing the combustible materials (i.e., the gas generant, auto-ignition material, and booster material). Seal 102 aids in preventing migration of moisture into cavity portion 100a, which aids in preventing degradation or contamination of the combustible materials prior to activation of the gas generating system. In the embodiment shown in FIG. 2, the seal 102 extends between and is secured to portions of shoulder 12f; however, the seal 102 may be mounted to any suitable surface or surfaces. Various known disks, foils, films, tapes, or other suitable materials may be used to form the seal.

Referring again to FIGS. 1-4, a resilient member 58 is positioned proximate housing first end 12a. Resilient member 58 abuts gas generant blocks 28 (described below) to aid in holding the gas generant material in place and in cushioning the gas generant against vibration and impact. In one embodiment, resilient member 58 is an annular cushion or pad. In another embodiment, the resilient member is in the form of a conventional spring. The structure of resilient member 58 engages and maintains the gas generant in position while enabling fluid communication between initiator 20 and any auto-ignition, booster, and gas generant material positioned in housing interior cavity 100, after activation of the gas generating system and rupture of any seal 102 positioned between the initiator and the combustible materials. Resilient member 58 may be formed from, a metallic material, ceramic fiber material, or from any other material suitable for the purposes described herein.

Referring again to FIG. 1, annular gas generant blocks 28 are stacked longitudinally along a portion of housing chamber 12c. In the embodiments shown, the gas generant stack abuts pad 58 at one end and a filter or screen 62 (described below) at an opposite end.

In one embodiment, the gas generant blocks comprise a high gas-yield, low solids-producing gas generant composition, such as a "smokeless" gas generant composition. Such gas generant compositions are exemplified by, but not limited to, compositions and processes described in U.S. Pat. Nos. 6,210,505, and 5,872,329, each incorporated by reference herein. As used herein, the term "smokeless" should be generally understood to mean such propellants as are capable of combustion yielding within a range of about 60% to about 80% gaseous products, based on a total product mass; and, as a corollary, no more than about 15% solid products and, preferably, about 10% solid products, based on a total product mass. U.S. Pat. No. 6,210,505 discloses various high nitrogen nonazide gas compositions comprising a nonmetal salt of triazole or tetrazole fuel, phase stabilized ammonium nitrate (PSAN) as a primary oxidizer, a metallic second oxidizer, and an inert component such as clay or mica. U.S. Pat. No. 5,872,329 discloses various high nitrogen nonazide gas compositions comprising an amine salt of triazole or tetrazole fuel, and phase stabilized ammonium nitrate (PSAN) as an oxidizer. Other types of gas generant materials may also be used, according to the requirements of a particular application.

In a particular embodiment, the gas generant material itself is auto-ignitable responsive to exposure to sufficient amount of heat transmitted from an exterior of the housing through housing 12 to the gas generant. This heat would be generated on the exterior of the housing by, for example, a fire or flame impinging on the housing. Use of an auto-ignitable gas generant material eliminates the need for a separate auto-ignition material in the housing. U.S. patent application Ser. No. 12/456,557 (filing date Jun. 18, 2009) and Ser. No. 12/384,563 (filing date Apr. 7, 2009), both incorporated herein by reference in their entireties, describe examples of gas generant materials with auto-ignition functions incorporated therein.

In one exemplary auto-ignitable gas generant formulation, as described in U.S. patent application Ser. No. 12/384,563, a composition containing about 30 wt % of 5-aminotetrazole, about 10 wt % of potassium 5-aminotetrazole, about 5 wt % of molybdenum trioxide, about 55 wt % of potassium nitrate (provided in approximately stoichiometric amounts calculated to oxidize 5-aminotetrazole and potassium 5-aminotetrazole) was formed by granulating each constituent to a desired size, in a known manner, and then blending and mixing each constituent to form a homogeneous composition. Each composition was then pelletized to form gas generating pellets as known in the art. The constituents are provided as a weight percent of the total composition. Hot plate tests, to determine hot plate ignition temperatures, were conducted by providing an aluminum plate approximately six inches in diameter and about 0.5 inches thick. A recessed portion was created in the middle portion of the aluminum plate. A thermocouple was embedded in the aluminum plate to determine the temperature and temperature differential. For each test conducted, a 250 mg sample was placed in the recess and the aluminum plate was heated at about 40 C per minute. The hot plate ignition temperature of this composition was determined to be 183 C. When heat aged at 107 C for 400 hours, the hot plate ignition temperature was determined to be 185 C, and mass loss was 0.3 wt %, indicative of high thermal stability. The term "ignition" means thermal ignition resulting in combustion as differentiated from decomposition. Combustion is seen as spontaneous light-emitting immediate conflagration with the resultant ash. As referred to throughout this description hot plate ignition temperatures were determined in the same way as described herein.

In another formulation, a composition containing about 6 wt % of 5-aminotetrazole and about 16 wt % of dinitrobenzoic acid, about 16 wt % of potassium 5-aminotetrazole, about 5 wt % of molybdenum trioxide, about 57 wt % of potassium nitrate was formed as described above. The constituents are provided as a weight percent of the total composition. The hot plate ignition temperature was determined to be 184 C. When heat aged at 107 C for 400 hours, the hot plate ignition temperature was determined to be 185 C, and mass loss was 0.26 wt %.

In yet another formulation, a composition containing about 16 wt % of 5-aminotetrazole, about 26 wt % of potassium 5-aminotetrazole, about 5 wt % of molybdenum trioxide, about 53 wt % of potassium nitrate was formed as described above. The constituents are provided as a weight percent of the total composition. The hot plate ignition temperature was determined to be 187 C. When heat aged at 107 C for 400 hours, the hot plate ignition temperature was determined to be 187 C, and mass loss was 0.05 wt %.

In yet another formulation, a composition containing about 20 wt % of dinitrobenzoic acid, about 20 wt % of potassium 5-aminotetrazole, about 5 wt % of molybdenum trioxide, about 55 wt % of potassium nitrate was formed as described above. The constituents are provided as a weight percent of the total composition. The hot plate ignition temperature was determined to be 187 C. When heat aged at 107 C for 400 hours, the hot plate ignition temperature was determined to be 188 C, and mass loss was 0.4 wt %.

In yet another formulation, a composition containing about 5 wt % of 5-aminotetrazole and about 16 wt % of nitroisophthalic acid, about 16 wt % of potassium 5-aminotetrazole, about 5 wt % of molybdenum trioxide, about 58 wt % of potassium nitrate was formed as described above. The constituents are provided as a weight percent of the total composition. The hot plate ignition temperature was determined to be 181 C. When heat aged at 107 C for 400 hours, the hot plate ignition temperature was determined to be 183 C, and mass loss was 0.2 wt %.

In yet another formulation, a composition containing about 5 wt % of dinitrobenzamide and about 15 wt % of dinitrobenzoic acid, about 20 wt % of potassium 5-aminotetrazole, about 5 wt % of molybdenum trioxide, about 55 wt % of potassium nitrate was formed as described above. The constituents are provided as a weight percent of the total composition. The hot plate ignition temperature was determined to be 181 C. When heat aged at 107 C for 400 hours, the hot plate ignition temperature was determined to be 180 C, and mass loss was 0.6 wt %.

In yet another formulation, a composition containing about 20 wt % of dinitrobenzoic acid, about 20 wt % of potassium 5-aminotetrazole, about 7 wt % of molybdenum trioxide, about 53 wt % of potassium nitrate was formed described above. The constituents are provided as a weight percent of the total composition. The hot plate ignition temperature was determined to be 186 C.

In yet another formulation, a composition containing about 18 wt % of dinitrobenzoic acid, about 21 wt % of potassium 5-aminotetrazole, about 7 wt % of molybdenum trioxide, about 54 wt % of potassium nitrate was formed as described above. The constituents are provided as a weight percent of the total composition. The hot plate ignition temperature was determined to be 187 C.

In yet another formulation, a composition containing about 20 wt % of dinitrobenzoic acid, about 20 wt % of potassium 5-aminotetrazole, about 9 wt % of molybdenum trioxide, about 51 wt % of potassium nitrate was formed as described above. The constituents are provided as a weight percent of the total composition. The hot plate ignition temperature was determined to be 186 C.

In yet another formulation, a composition containing about 20 wt % of 5-aminotetrazole and about 16 wt % of dinitrobenzoic acid, about 16 wt % of potassium 5-aminotetrazole, about 5 wt % of molybdenum trioxide, about 57 wt % of potassium nitrate was formed as described above. The constituents are provided as a weight percent of the total composition. The hot plate ignition temperature was determined to be 184 C.

Other compositions described in the above-mentioned references may also be used in embodiments of the present invention.

The auto-igniting gas generant material may be positioned in housing 12 so as to enable thermal communication with the housing after activation of the gas generating system, thereby enabling heat transfer from an exterior of the housing to the auto-igniting gas generant material using the housing as a heat transfer medium. Alternatively, the auto-igniting gas generant material may be positioned in housing 12 so as to enable thermal communication with an exterior of the housing after activation of the gas generating system, to enable heat transfer from the exterior of the housing to the auto-igniting gas generant material using a heat-transfer medium other than the housing.

The annular structure of blocks 28 combines with the stacked arrangement of the gas generant blocks to form a longitudinal chamber 28a which contains the booster material 27 and auto-ignition material 29 (described below), and in which the auto-ignition and booster materials combust when ignited by initiator 20. Combustion of the auto-ignition and booster materials results in combustion of the gas generant, in a manner known in the art.

Referring again to FIG. 1, a quantity of a known or suitable ignition or booster compound 27, whose combustion ignites gas generant material 28, may be positioned within chamber 28a. In one embodiment, booster compound 27 is a known auto-igniting booster material positioned in housing 12 so as to enable thermal communication with the housing after activation of the gas generating system, thereby enabling heat transfer from an exterior of the housing to the auto-igniting booster material using the housing as a heat transfer medium. Alternatively, the auto-igniting booster material may be positioned in housing 12 so as to enable thermal communication with an exterior of the housing using a heat-transfer medium other than the housing. In a particular embodiment, the auto-igniting booster material comprises the same auto-igniting material used for the main gas generant 28.

An auto ignition material (not shown) may be placed in cavity 28a in proximity to the booster material 27 and positioned in housing 12 so as to enable thermal communication with the housing after activation of the gas generating system, thereby enabling heat transfer from an exterior of the housing to the auto ignition material using the housing as a heat transfer medium. Alternatively, the auto ignition material may be positioned in housing 12 so as to enable thermal communication with an exterior of the housing using a heat-transfer medium other than the housing. The auto-ignition material ignites responsive to heat transmitted thereto from an exterior of the housing, and facilitates ignition of a booster and/or gas generant material positioned in the housing, in a manner known in the art.

A filter 62 is positioned within housing 12 for filtering particulates from gases generated by combustion of gas generant 28 and/or for cooling the generated gases. Filter 62 is generally configured to conform to the shape of the housing cavity in which it is positioned, and may be formed from any of a variety of materials (for example, a carbon fiber, metallic mesh, or a compressed knitted metal wire) known in the art for filtering gas generant combustion products. Suitable metallic mesh is readily obtainable from suppliers such as Wayne Wire, Inc., of Kalkaska, Mich. Suitable compressed knitted metal wire is commercially available from vendors such as Metex Corp. of Edison, N.J.

Referring to FIG. 4, in a particular embodiment, the filter 62 is formed from a collection of heat-absorbent members 162 positioned in housing chamber 100 along a flowpath of combustion gases from combustion chamber 100*a* to gas exit opening 190*a* positioned proximate housing second end 12*b*. Members 162 may be formed from a material such as a metal, metal alloy, or other heat-absorbing material for facilitating heat transfer from the generated gases. In one embodiment, members 162 are substantially spherical and are formed from steel (for example, steel balls or BB's). Other materials and shapes may also be used for members 162. Members 162 of the collection of members may be arranged or loaded within housing 12 so as to form one or more tortuous gas flow paths for gases passing through the collection. In addition, features such as the sizes of the members, shapes of the members, and the materials from which the members are formed may be specified so as to control the sizes of the resulting gas flow passages and to enable the collection of members to filter particulates from the generated gases.

At each end of the collection of members 162, a screen 98, 99 is positioned for containing the members within a predetermined portion of housing cavity 12*a*. Screens 98, 99 are formed from a porous material (for example, a mesh) or otherwise have orifices formed therein to enable the generated gases to pass through screen 98 into members 162, and through screen 99 out of the collection of members 162 to gas exit opening(s) 190*a*. Screens 98, 99 may also be structured to remove particulates from the generated gases.

Optionally, as in the embodiments shown in FIGS. 1-4*a*, a rupturable, fluid-tight seal or shim 170 may be positioned between filter 62 and gas exit orifice(s) 190*a* formed in a nozzle 190 (described below) positioned at housing second end 12*b*. Seal 170 aids in preventing migration of moisture into cavity portion 100*a*, which aids in preventing degradation or contamination of the combustible materials prior to activation of the gas generating system. In the embodiments shown in FIGS. 1-4, the seal 170 is stretched between and secured to suitable surfaces on nozzle 190; however, the seal 170 may be mounted to any suitable surface or surfaces. Various known disks, foils, films, tapes, or other suitable materials may be used to form the seal.

A nozzle 190 is positioned and secured at housing second end 12*b* and contains one or more gas exit orifices 190*a* for enabling fluid communication between an interior of the housing and an associated inflatable device (for example, an airbag or a safety belt pretensioner incorporated into a vehicle occupant protection system.). Nozzle 190 directs generated gases from the housing interior into the associated inflatable device. Nozzle 190 is formed separately from housing 12 and may be attached to housing second end 12*b* by welding, adhesive attachment, threaded engagement, or any other suitable means, depending on the materials from which the housing and nozzle are formed, the operational requirements of a particular application, and other pertinent factors. The nozzle 190 is attached to housing 12 so as to form a gas-tight seal between the nozzle and the housing. Nozzle 190 may be forged, machined, molded or otherwise formed from a metallic material, a polymer material, or any other suitable material depending on the requirements of a particular application. Orifice(s) 190*a* may be drilled, punched, molded into the part, or otherwise suitably formed.

Nozzle 190 may also have any of a variety of suitable configurations and may include any desired number of orifices 190*a* in any configuration suitable for a given application. In the embodiments shown in FIGS. 1 and 4, nozzle 190 comprises a block of material having a single orifice 190*a* extending therethrough for directing generated gases in a particular direction, and a side portion 190*b* formed therealong to provide a mounting surface to facilitate mounting of the nozzle to a portion of a vehicle. In one embodiment, the orifice 190*a* is configured so as to channel the generated gases out of the housing along, or in a direction parallel to, a longitudinal axis of the housing 12.

The nozzle side portion 190*b* may be shaped so as to be receivable in a complementarily-shaped cavity formed in the portion of the vehicle, or the nozzle side portion 190*b* may be shaped to mate or engage with a complementarily-shaped feature on the portion of the vehicle. This serves to orient and maintain the housing 12 and the attached nozzle 190 in a particular configuration during operation to help control the direction of flow of gases exiting the gas generating system. Mounting of the side portion in a complementarily-shaped cavity or to a complementarily-shaped feature aids in preventing movement of the housing due to reaction forces caused by outflow of the generated gases. In the particular embodiment shown in FIGS. 1 and 4, the nozzle side portion 190*b* is rectangular in shape and is configured to be received in a complementary cavity or slot formed in a portion of the vehicle to which the gas generating system is mounted. However, the portion of the nozzle engaged or interfacing with the portion of the vehicle have any shape suitable for a particular application.

Referring to FIGS. 5-7, in a particular embodiment, nozzle 190 is attached to housing 12 such that the nozzle side portion 190*b* serves as the only portion of the gas generating system attached to the portion of the vehicle. The connection between the housing and the nozzle may be configured such that a gas-tight connection is maintained responsive to reaction forces exerted on the connection due to such factors as the weight of the housing and it contents, outflow of the generated gases from the housing, and any other operational factors tending to stress the connection. The connection between the nozzle and the portion of the vehicle to which the gas generating system is attached may also be configured such that the connection is maintained responsive to reaction forces exerted on the connection due to such factors as the weight of the housing and it contents, outflow of the generated gases from the housing, and any other operational factors tending to stress the connection.

In the embodiment shown in FIGS. 5-7, the gas generating system is positioned inside a folded airbag 300 and the nozzle 190 is attached to the portion 310 of the vehicle using a bolt 320 which extends through the portion 310 of the vehicle and through a wall of the airbag into a threaded opening formed in the nozzle. Alternatively, a stud may be attached to the nozzle so as to project from nozzle side portion 190*b* for insertion through the airbag wall and into an opening formed in the portion 310 of the vehicle. The stud may then be anchored using a nut or other suitable securement mechanism. Other mechanisms for securing the nozzle to the portion of the vehicle may also be used.

Referring to FIGS. 5-7, reaction forces on the nozzle due to outflow of generated gases from the nozzle may be minimized or eliminated by an arrangement of orifice(s) 190a that provides a thrust-neutral release of gases from the nozzle (i.e., the sum of the reaction forces on the nozzle due to the flow of gases therefrom is either minimized or near zero).

In one embodiment, a thrust-neutral release of gases is achieved by the arrangement 330 of flow passages shown in FIG. 6. Arrangement 330 includes a gas-receiving cavity 340 positioned to enable fluid communication with housing cavity portion 100a after activation of the gas generating system and subsequent rupture of any shim 170 (described below) positioned between the nozzle gas exit orifices 190a and cavity portion 100a. At least one branch passage 350 extends from gas-receiving cavity 340 to at least one associated bi-directional gas exit passage 370. As used herein, the term "bi-directional gas exit passage" refers to a passage from which gases exit the nozzle only in two opposite directions. Branch passage 350 enables fluid communication between gas-receiving cavity 340 and gas exit passage 370. In the embodiment shown in FIG. 6, multiple branch passages 350 extend generally laterally or radially away from axis L and slightly in the general direction of gas flow within housing 12 (direction B in FIG. 6). Other arrangements and/or orientations of branch passages 350 are also possible, depending on the requirements of a particular application.

As used herein, the term "axial reaction forces" refers to reaction forces acting on nozzle 190 along axes parallel or substantially parallel (within the limits imposed by fabrication and assembly tolerances) to a longitudinal axis L of housing 12. In a particular embodiment, such axial reaction forces on the nozzle due to outflow of generated gases may be minimized or eliminated by an arrangement of orifice(s) 190a that provides a axially thrust-neutral release of gases from the nozzle (i.e., the sum of the reaction forces on the nozzle due to the flow of gases therefrom is either minimized or near zero).

As seen in FIG. 6, gas exit passage 370 extends from the intersection with branch passage 350 in two opposed directions A and B. In a particular embodiment, the opposed directions A and B extend along an axis X parallel or substantially parallel (within the limits imposed by fabrication and assembly tolerances) to housing axis L. This minimizes the resultant axial reaction force acting on the gas generating system mounting to the portion of the vehicle and also provides bi-directional, axially-oriented gas flow from the gas generating system. This bi-directional gas flow can also facilitate more uniform inflation of the folded airbag by simultaneously directing gases to multiple portions of the airbag. Nozzle 190 may have any desired number branch and/or exit passages.

In other embodiments, the axis X may not be oriented parallel to housing axis L, but may have any desired orientation with respect to the branch passage. This enables thrust-neutral, bi-directional flow in two opposed directions along an axis X having any of a variety of orientations.

In another embodiment (shown in FIGS. 2 and 3), nozzle 190 is drawn or otherwise formed into a hollow, tubular configuration and includes multiple gas exit orifices 190a arranged so as to direct the generated gases in multiple directions as the gases exit the gas generating system.

Optionally, a rupturable, fluid-tight seal 170 may be positioned proximate housing second end 12b to isolate or seal off cavity portion 100a containing the combustible materials. Seal 170 aids in preventing migration of moisture into cavity portion 100a, which aids in preventing degradation or contamination of the combustible materials prior to activation of the gas generating system. In the embodiments shown in the drawings, the seal 170 is secured to portions of nozzle 190 and extends across a portion of the nozzle so as to provide a fluid-tight barrier between gas exit orifices 190a and the interior of housing 12. However, the seal 170 may be mounted to any suitable surface or surfaces. Various known disks, foils, films, tapes, or other suitable materials may be used to form the seal.

Figure 9:
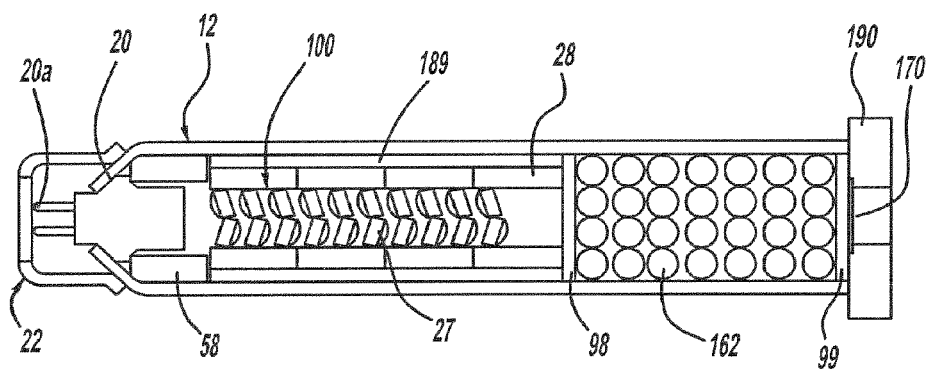
FIG. 9 is a cross-sectional side view of a gas generating system in accordance with another embodiment of the present invention.
Figure 10:
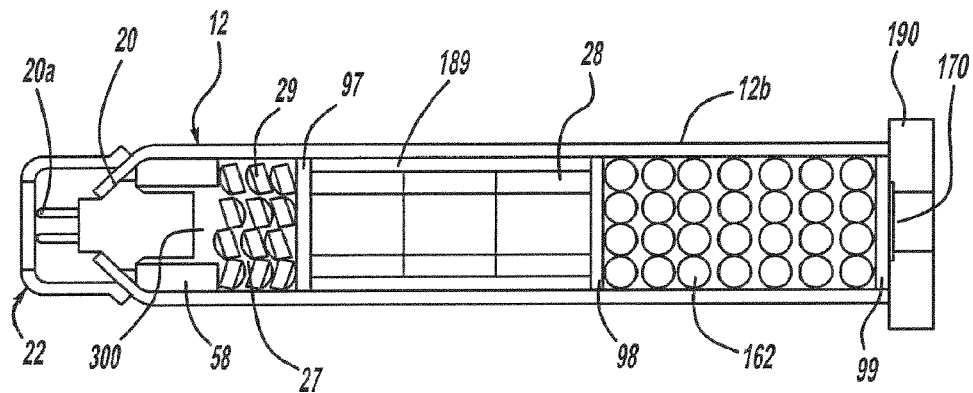
FIG. 10 is a cross-sectional side view of a gas generating system in accordance with another embodiment of the present invention.
Figure 11:
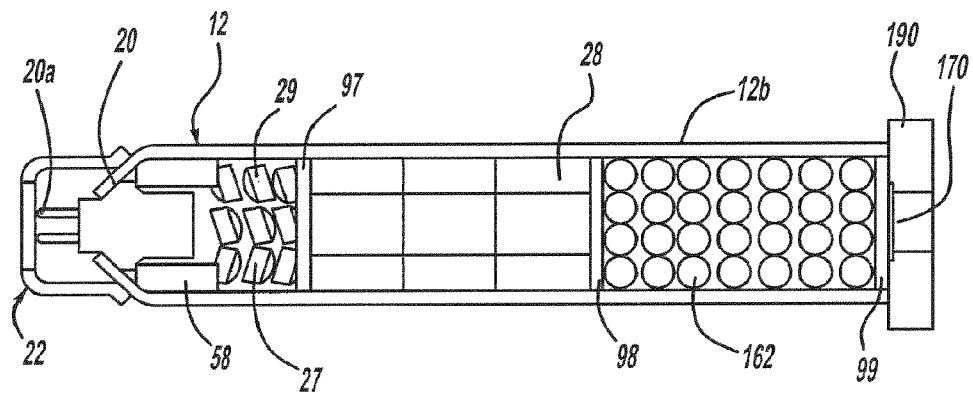
FIG. 11 is a cross-sectional side view of a gas generating system in accordance with another embodiment of the present invention.

FIGS. 9-11 show cross-sectional side views of gas generating systems in accordance with additional embodiments of the present invention.

The structure of the embodiment shown in FIG. 9 essentially the same as that shown in FIG. 4. However, a thermally-insulating wall 189 encloses the gas generant material 28. Wall 189 may be formed as a single piece or from multiple pieces secured to each other or otherwise held in position within the housing. Wall 189 may be formed from any suitable thermally-insulating material, for example, a polymer or a ceramic material. Wall 189 insulates the gas generant from housing 12 to aid in impeding or preventing heat transfer from an exterior of the housing to the gas generant via the housing.

The structure of the embodiment shown in FIG. 10 is essentially the same as that shown in FIG. 9. However, the gas generant material 28 is positioned between screen 98 and an additional screen 97 as previously described positioned spaced apart from resilient member 58 to define a cavity 300 configured so as to enable fluid communication with the initiator 20 after activation of the gas generating system. In this embodiment, cavity 300 contains a booster material 27 and/or an auto-ignition material 29 in one of the booster material and/or auto-ignition material embodiments previously described.

The structure of the embodiment shown in FIG. 11 is essentially the same as that shown in FIG. 10, but without the thermally-insulating wall 189.

Referring now to FIG. 8, any of the gas generating system embodiments described herein may be incorporated into an airbag system 200. Airbag system 200 includes at least one airbag 202 and a gas generating system 10 as described herein coupled to airbag 202 so as to enable fluid communication with an interior of the airbag. Airbag system 200 may also be in communication with a crash event sensor 210 operating in association with a known crash sensor algorithm that signals actuation of airbag system 200 via, for example, activation of airbag gas generating system 10 in the event of a collision.

Referring again to FIG. 8, airbag system 200 may also be incorporated into a broader, more comprehensive vehicle occupant restraint system 180 including additional elements such as a safety belt assembly 150. FIG. 8 shows a schematic diagram of one exemplary embodiment of such a restraint system. Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of suitable pretensioners are described in U.S. Pat. Nos. 6,505,790 and 6,419,177, incorporated herein by reference.

Safety belt system 150 may also be in communication with a crash event sensor 158 (for example, an inertia sensor or an accelerometer) operating in association with a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A gas generating system comprising: a housing; and a nozzle coupled to the housing and structured for attachment to an object by an attachment means, the nozzle including at least one bi-directional gas exit passage configured to provide a thrust-neutral release of gases from the nozzle, so as to minimize forces transmitted from the nozzle to the attachment means due to flow of gases from the nozzle.

2. The system of claim 1 wherein the nozzle is structured for direct attachment to the object.

3. A vehicle comprising a gas generating system in accordance with claim 1.

* * * * *